UNITED STATES PATENT OFFICE.

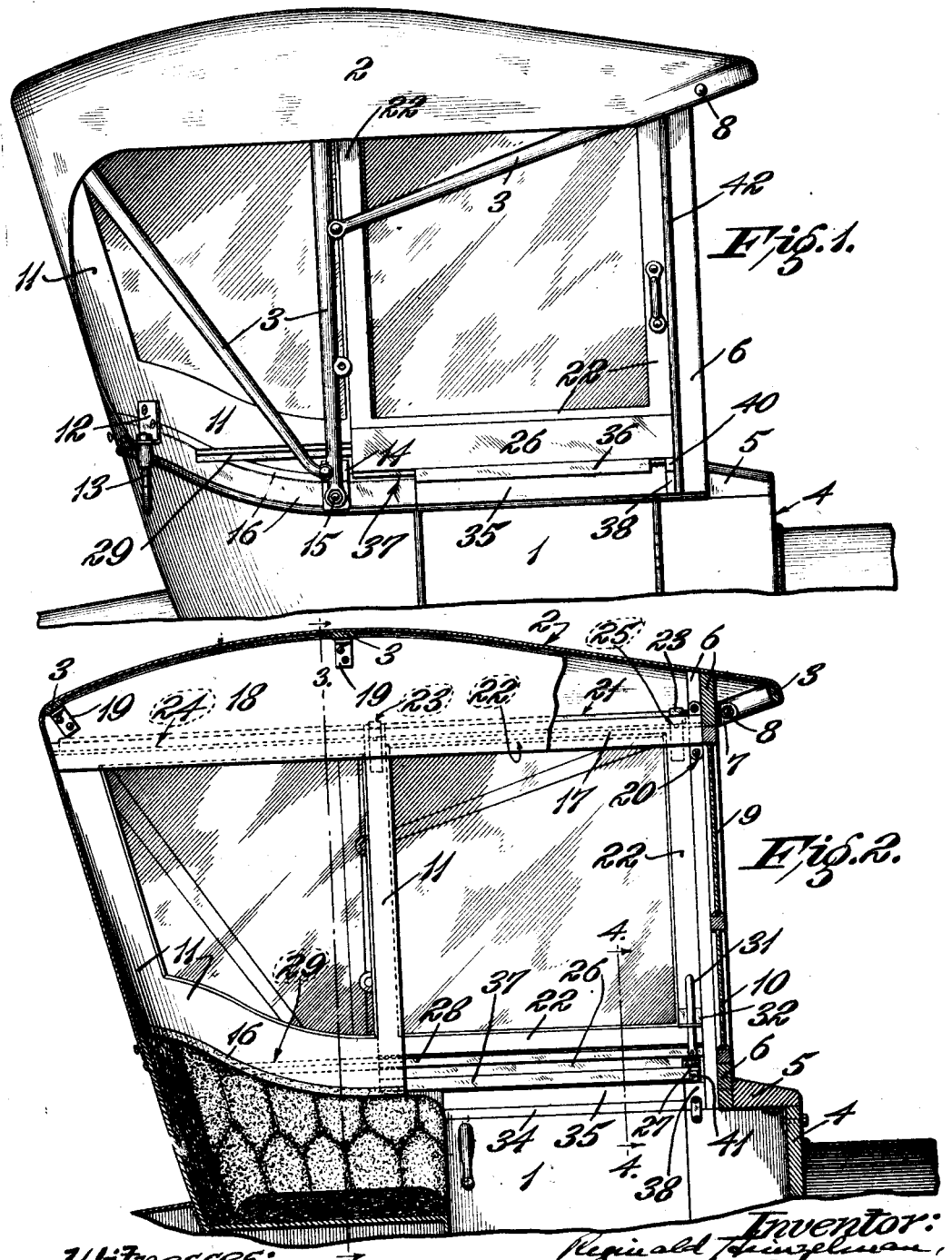

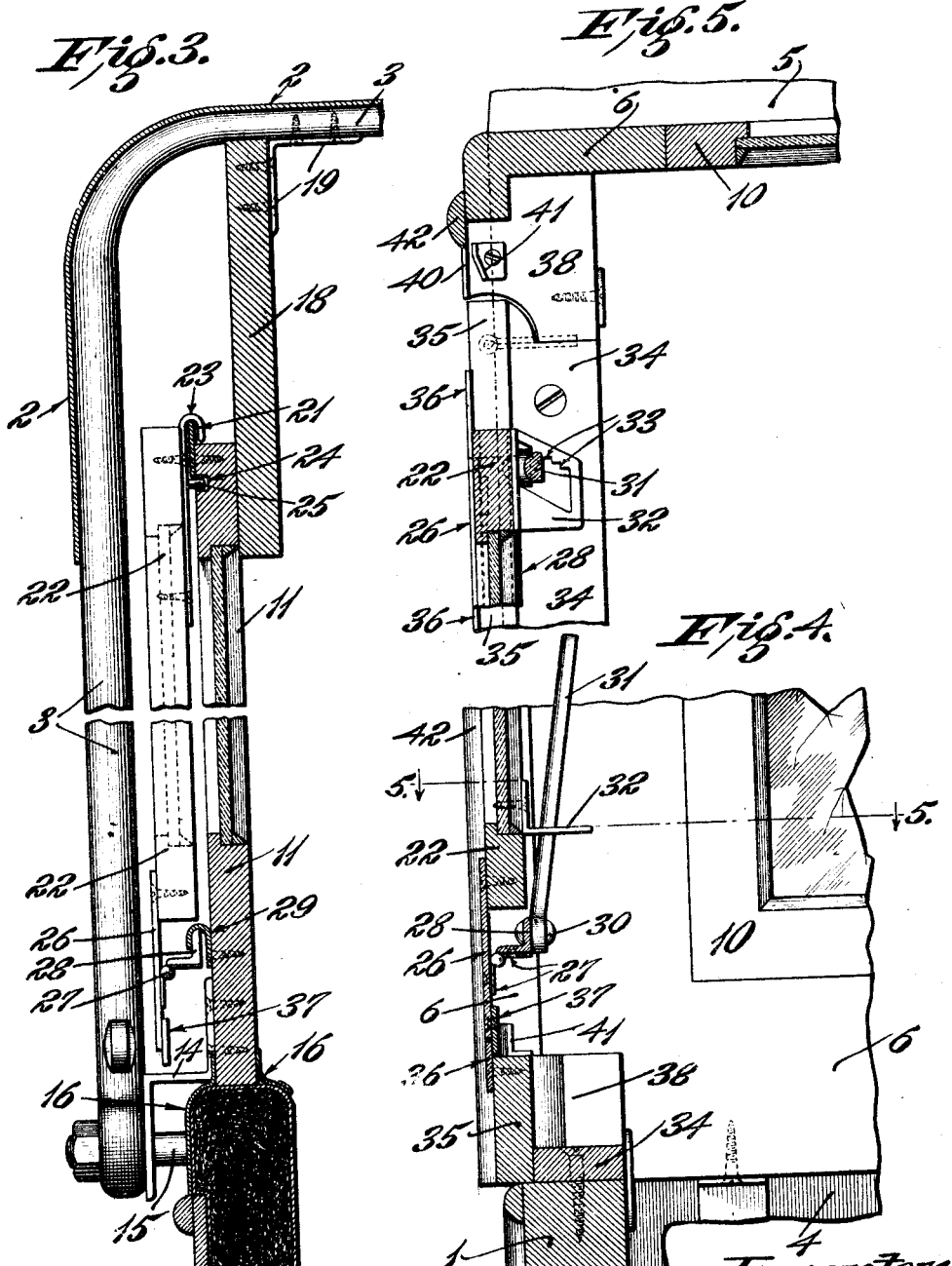

REGINALD HEINZELMAN, OF BELLEVILLE, ILLINOIS.

STORM SIDES AND FRONT FOR VEHICLES.

1,196,777. Specification of Letters Patent. Patented Sept. 5, 1916.

Application filed February 8, 1915. Serial No. 6,678.

*To all whom it may concern:*

Be it known that I, REGINALD HEINZELMAN, a citizen of the United States, and a resident of the city of Belleville, county of St. Clair, and State of Illinois, have invented a new and useful Improvement in Storm Sides and Fronts for Vehicles, of which the following is a specification.

This invention relates to glazed sides and fronts for automobiles and similar vehicles, particularly for open vehicles, which have canopy or folding tops and side doors.

One of the objects of the invention is a complete front and sides which can be easily attached to the body and top of an open vehicle to fit in and close the space between them, thereby transforming said open vehicle into a closed vehicle. In furtherance of this object the sides are provided with horizontally slidable windows located above the doors of the vehicle, and which can be easily opened to permit entrance and egress.

A further object of the invention is a vehicle side wall having a window therein which is slidably mounted and which can be securely fastened in either closed or open position, or partly open at any point of its travel.

A further object is an automobile side wall attachment of the character specified in which the joint between the sliding window therein and the door of the automobile will be practically weathertight and will not interfere with opening the door in any position of the window.

Further objects relate to the details of the construction of glazed fronts and sides for vehicles of the type shown in the accompanying drawings, which details will be more fully set forth hereinafter.

The invention consists in the parts and in the arrangements and combinations of parts more fully set forth hereinafter, and particularly pointed out in the claims.

Referring to the accompanying drawings which form part of this specification, and in which like reference characters refer to like parts in the several views, Figure 1 is a side elevation of an automobile showing a glazed front and sides embodying the invention applied thereto, the lower part of the automobile being broken away; Fig. 2 is a vertical longitudinal section of the closed top portion of the automobile shown in Fig. 1; Fig. 3 is a fragmentary vertical cross-section through one side of the same on the line 3—3 on Fig. 2, said section being drawn to a larger scale than Figs. 1 and 2; Fig. 4 is a similar cross-section, taken on the line 4—4 on Fig. 2; and Fig. 5 is a fragmentary horizontal cross-section taken on the line 5—5 on Fig. 4.

Referring to the accompanying drawings, the vehicle to which the invention is shown applied is a one-seated automobile of well known construction. This automobile has the usual open body, each side of which is provided with an outwardly swinging side door 1. A folding top 2 of the usual construction is supported by three bows 3, which are hinged together and pivoted to the sides of the body in the usual manner.

According to this invention, a cowl 5 is secured to the front board or dash 4 of the vehicle body, and to this cowl 5 is securely fastened the upright frame 6 for the glazed front. The top rail of the frame 6 is fastened by angle brackets 7 and bolts 8 to the front bow 3 of the top 2. Mounted in the upright frame 6 are an upper sash 9 and a lower sash 10, each of which is pivotally connected near one edge to the frame 6 so as to swing on a horizontal axis, and which sashes when closed completely fill the space within the frame. The upper sash 9 can be swung outwardly, and the lower sash 10 can be swung inwardly, similarly to the usual windshield. The upper sash 9 and the lower sash 10 are each provided with suitable braces or clamping devices (not shown) whereby they may be secured at any desired angular position.

The glazed side walls for the sides of the vehicle top are constructed alike, except for their being made left and right hand, respectively, and a description of one will suffice for both. The rear portion of each comprises an open quadrilateral frame 11, which is closed by a fixed pane of glass or other suitable material. The bottom rail of the side frame 11 is shaped to conform to the curvature of the upper edge of the rear portion of the body of the vehicle, which in the present instance is the arm-rest or upholstered side of the seat of the vehicle. The side frames 11 are fastened to the body of the vehicle in any suitable manner. In the particular construction shown in the drawings, an angle bracket 12 is fastened by screws to the bottom rail of each side frame 11 near the rear end thereof, and said angle bracket is fastened to the hook-shaped member 13 which is commonly provided on automobiles to support the folding top when it is thrown back. A Z-shaped bracket 14 is fastened by screws to the bottom rail of the side frame 11 near the front end thereof, and said bracket 14 is fixed to the bolt 15 which supports the folding top 2 of the vehicle (see Fig. 3). Flaps 16 (see Fig. 3) are secured to the bottom rail of the frame 11 at the outside and inside thereof to cover the joint between said bottom rail and the body of the vehicle. The outside flap 16 is preferably of thin sheet metal, such as tin; and the inside flap 16 is a strip of trimming, braid or waterproof fabric.

The top rail 17 of the side frame 11 is fastened to a top spacing board 18 which extends longitudinally of the vehicle. The upper edge of the top spacing board 18 is shaped to conform to the under surface of the top 2, and said top spacing board 18 is secured by angle brackets 19 to both the rear and the intermediate bows 3 of the top 2. The top rail 17 extends forwardly to the adjacent upright side of the frame 6 of the windshield. Secured on the outside of the front end of the top rail 17 is a flat securing member 20 (see Fig. 2), which in turn is bolted to the inside of the frame 6 of the windshield. Secured along the outside of the top rail 17 of each side frame 11 is a flat metal strip 21 which projects above the upper edge of said top rail and forms a track for the windows to slide on.

The front portion of each side is closed by a window 22 which is supported from the top rail 17 of the side frame 11 by hook-shaped hangers 23 which engage over the upper edge of the strip or track 21. In the outer face of the top rail 17 and below the track 21 is a longitudinal groove 24. Secured to each hanger 23 is a pin 25 which is guided in the groove 24 and retains the hangers on the track. Secured to the frame of the window 19 along the lower edge thereof is a downwardly projecting plate 26, preferably of metal. Pivoted to the plate 26 by hinges 27 is a rocking-bar 28, preferably an angle-iron. Secured to the bottom rail of each side frame 11 is a lower track 29, which is substantially inverted U-shaped in cross-section. The upper edge of the rocking-bar 28 engages under the lower track 29 and between its side walls. An upwardly projecting handle 31 is pivotally fastened by a rivet 30 to the rocking-bar 28. The handle 31 projects through a slot in the horizontal portion of an angle bracket 32 which is secured to the frame of the window 22 on its inner side. Teeth 33 are provided along one side of the slot in the bracket 32 for holding the handle in locking position, the handle having a sharp edge for engaging said teeth 33.

A horizontal wooden strip 34 is secured by screws along the top edge of each door 1, and secured to the horizontal strip 34 is a vertical spacing board 35. A weather strip 36, preferably made of thin metal, is fastened by screws to the vertical strip 35 along its outer edge, the top edge of the weather strip projecting a short distance above the upper edge of the spacing board 35. The plate 26 which is secured to the frame of the window 22 has a narrow strip 37, preferably of metal, arranged along its lower edge which projects downwardly inside of the upper edge of the weather strip 36 when the door 1 is in its closed position. The strip 36 terminates a short distance from the axis of the hinges of the door 1 (see Fig. 5), in order that the door 1 may be opened while the window 22 is closed or partly open without interference between the strips 36 and 37.

Fastened to the cowl 5 and to the body of the vehicle immediately in front of the front edge of each door 1 is a block 38, (see Fig. 5), the outer rear corner of which is cut out in the arc of a circle having the axis of the hinges of the door 1 as its center. The horizontal strip 34 and the vertical filler board 35 which are secured to the top of the door 1 both extend a short distance beyond the hinged edge of the door 1, and the projecting ends of said strips are rounded to fit into the rounded cut out portion of the block 38 to close the joint between the two at the hinge. On the top of the block 38 there are fastened two guide members for the end of the strip 37, an outer guide member 40 and an inner guide member 41. The outer guide member 40 is a strip of metal which extends parallel with the strip 37, and the inner guide 41 comprises an angle member the base portion of which is fastened to the upper face of the block 38, and the vertical portion of which extends at an angle across the line of movement of the window to guide the front end of the strip 37 when the window is being closed. Secured to the outer edge of each side of the front frame 6 is a strip of beading or weather stripping 42, behind which the front edge of the window 22 engages when said window is closed.

The sliding window 22 on each side of the vehicle can be easily slipped back out of the way to permit entrance or egress, or said window may be partly opened and locked in any position for ventilation. The weight of each window 22 is supported from the upper track 21, and the lower track 29 coöperates with the rocking member 28 to prevent the window from swinging outwardly at its bottom. To fasten the window 22 the handle 31 pivoted to the rocking-bar 28 is pressed outwardly toward the window. The rocking-bar 28 is swung on its hinges 27, and coöperates with the lower track 29 to pull the window 22 downwardly and inwardly. The handle 31 is held in whatever position it is placed by engagement with the teeth 30 of the bracket 32. The window 22, being drawn downwardly and inwardly is held firmly from movement either sidewise or endwise, and from shaking and rattling.

The strip 37 at the bottom of the window 22 and the strip 36 at the top of the door 1 of the vehicle coöperate to make a weather tight joint between the window 22 and the door 1, when the window and door are both closed. As the window 22 is pushed closed, the strip 37 at its bottom engages between the guide members 40 and 41 and the front edge of the window 22 is thereby guided behind the weather bar 42 to form a weather tight joint with the windshield frame 6.

The windows may be opened or closed with the doors in either open or closed position, and the doors may be opened or closed when the windows 22 are closed or partly open.

The different parts of the front and side frame members, hereinbefore described are arranged and provided with suitable fastening devices so that said parts may be easily attached in position, or detached and removed, without necessitating skilled labor.

The particular construction shown and hereinbefore described may be considerably modified without departing from the invention, and I do not wish to be restricted to details of this construction shown and described.

What I claim is:

1. A sliding window construction for automobiles and similar vehicles comprising a frame shaped to fit in the space between the body and the top of the vehicle, said frame having brackets for attaching it to said vehicle, a window slidably mounted on said frame and arranged to slide across the doorway of said vehicle, said window having a slide across its lower edge engaging with a slide on said frame terminating at said doorway and adapted for holding said window against sliding and rattling at any point in its travel.

2. A sliding window construction for automobiles and similar vehicles comprising a frame shaped to fit into the space between the body and the top of the vehicle, said frame having brackets for attaching it to the top and to the body of said vehicle, said frame having an upper track arranged to extend over the doorway of said vehicle, a window slidably mounted on said upper track, a lower track secured to said frame, a rocking-bar mounted on said window and coöperating with said lower track in all positions of said window, and means for rocking said rocking-bar to pull said window downwardly and sidewise to hold said window in place, whereby endwise movement and rattling thereof is prevented.

3. A sliding window construction for automobiles and similar vehicles comprising a frame shaped to fit into the space between the body and the top of the vehicle, said frame having brackets for attaching it to said vehicle, an upper track secured to said frame, a window having hangers engaging said upper track, a lower track substantially inverted U-shaped in cross-section secured to said frame, a rocking-bar movably connected to said window and coöperating with said lower track in all positions of said window, and means for rocking said rocking-bar in frictional engagement with said lower track.

4. In combination with a vehicle having a body and a top, said body being provided with swinging side doors, side frames fitted between said body and said top and detachably secured thereto, each of said side frames having a window slidably mounted therein over the corresponding door of said vehicle, said windows and said doors having coöperating strips attached thereto which overlap to exclude the weather, the door strips being arranged outside of the window strips whereby said doors can be opened without interfering with said windows in any position of the latter, and means for holding said windows against endwise and sidewise movement at any point in their travel.

5. The combination with a vehicle having a body and a top, of sides fitted between said body and said top and detachably secured thereto, each of said sides having a window slidably mounted therein and arranged to open and close the space above a doorway of said vehicle, a storm front secured to the front of the body of said vehicle and extending between said body and the top of said vehicle, said sides having top rails secured to said storm front, hangers for suspending said windows from said top rails, and means on the lower edges of said windows for holding them against endwise and sidewise movement at any point in their travel.

6. A combination glass front and sides for automobiles and similar vehicles having tops and side doors, said sides being fitted between the body and the top of said vehicle and secured thereto, a window slidably mounted in each of said side frames, said front being secured to the front ends of said sides and body of said vehicle and to the top of said vehicle, a horizontal strip arranged vertically along the outside of the top of each door and a vertical strip secured to said front along each side thereof, the lower and front edges of said windows being inside of said strips when said windows are in their closed position whereby said doors can be opened without opening said windows.

7. The combination with the side of a vehicle, of a window having hangers near the top thereof, an upper track secured to said side, the lower track substantially inverted U-shape in cross-section and secured to said side, an angle iron having one leg thereof hinged to said window below said lower track and the other leg thereof vertically disposed between the sides of said lower track, and means for rocking said angle iron on its hinges to engage the under side of the bend of said lower track.

8. The combination with the side of a vehicle, of a sliding window, said window having hangers near the top thereof, an upper track secured to said side and supporting members coöperating with said upper track to support said window, said side having a longitudinal groove therein below said upper track, pins secured to said window and engaging said groove, a lower track secured to said side, a rocking-bar movably connected to said window and coöperating with said lower track, and means for rocking said rocking-bar against the bottom face of said track to pull said window downwardly and sidewise, whereby said window is held from endwise or sidewise movement at any point in its travel.

9. The combination with the side of a vehicle, of a sliding window, said window having hangers near the top thereof, an upper track secured to said side and supporting members coöperating with said upper track to support said window, a lower track secured to said side, a rocking-bar movably connected to said window and coöperating with said lower track in all positions of said window, and means for rocking said rocking-bar against the bottom face of said lower track to pull said window downwardly and sidewise, whereby said window is held from endwise or sidewise movement at any point in its travel.

Signed at Belleville, Ill., this 5th day of February, 1915.

REGINALD HEINZELMAN.

Witnesses:
ARTHUR F. BALDUS,
ANNA E. THEISS.